United States Patent
Inagaki (10) Patent No.: US 8,289,601 B2
(45) Date of Patent: Oct. 16, 2012

(54) OPTICAL SCANNING DEVICE

(75) Inventor: Yoshihiro Inagaki, Toyokawa (JP)

(73) Assignee: Konica Minolta Business Technologies, Ltd., Chiyoda-Ku, Tokyo (JP)

( * ) Notice: Subject to any disclaimer, the term of this patent is extended or adjusted under 35 U.S.C. 154(b) by 161 days.

(21) Appl. No.: 12/862,269

(22) Filed: Aug. 24, 2010

(65) Prior Publication Data

US 2011/0043879 A1   Feb. 24, 2011

(30) Foreign Application Priority Data

Aug. 24, 2009   (JP) .................................. 2009-193259

(51) Int. Cl.
*G02B 26/08* (2006.01)

(52) U.S. Cl. .................................................. 359/204.1

(58) Field of Classification Search ............... 359/204.1, 359/216.1; 347/233, 238, 241–244
See application file for complete search history.

(56) References Cited

U.S. PATENT DOCUMENTS

| | | | |
|---|---|---|---|
| 6,034,806 | A | 3/2000 | Inagaki et al. |
| 6,903,855 | B2 * | 6/2005 | Aoki et al. ................. 359/204.1 |
| 7,164,515 | B2 | 1/2007 | Ito et al. |
| 2004/0031915 | A1 | 2/2004 | Ito et al. |
| 2007/0146738 | A1 | 6/2007 | Nakajima |
| 2009/0175657 | A1 | 7/2009 | Yoshii et al. |

FOREIGN PATENT DOCUMENTS

| | | |
|---|---|---|
| JP | 10-253903 | 9/1998 |
| JP | 11-048520 | 2/1999 |
| JP | 2003-182139 A | 7/2003 |

(Continued)

OTHER PUBLICATIONS

Office Action (Notification of Reasons for Refusal) dated May 24, 2011, issued in the corresponding Japanese Patent Application No. 2009-193259, and an English Translation thereof.

(Continued)

*Primary Examiner* — Euncha Cherry
(74) *Attorney, Agent, or Firm* — Buchanan Ingersoll & Rooney PC (57) ABSTRACT

An optical scanning device to be employed in an image forming apparatus having a photosensitive member that is scanned with a plurality of beams, and the optical scanning device has a plurality of light emitting elements that are arranged in an area of a parallelogram, in a matrix of M rows and N columns, all the light emitting elements emitting beams, and a deflector for deflecting the beams emitted from the light emitting elements. The light emitting elements are arranged such that the beam emitted from the light emitting element located in the mth row and the nth column and the beam emitted from the light emitting element located in the (m−1)th row and the (n+1)th column are scanned on adjacent scanning lines on the photosensitive member, and a scanning line on which the beam emitted from the light emitting element in the first row and the first column is scanned at a time of the (L+1)th scanning motion of the light emitting elements is located in an area from a scanning line on which the beam emitted from the light emitting element in the first row and the first column is scanned at a time of the Lth scanning motion of the light emitting elements to a scanning line on which the beam emitted from the light emitting element in the Mth row and the Nth column is scanned at a time of the Lth scanning motion of the light emitting elements.

10 Claims, 10 Drawing Sheets

FOREIGN PATENT DOCUMENTS

| | | |
|---|---|---|
| JP | 2004-077714 | 3/2004 |
| JP | 2006-272653 | 10/2006 |
| JP | 2007-168299 A | 7/2007 |
| JP | 2009-163137 | 7/2009 |

OTHER PUBLICATIONS

Japanese Office Action dated Feb. 7, 2012, in corresponding Japanese Application No. 2009-193259, together with an English translation thereof.

* cited by examiner

OPTICAL SCANNING DEVICE

This application is based on Japanese Patent Application No. 2009-193259 filed on Aug. 24, 2009, the content of which is incorporated herein by reference.

BACKGROUND OF THE INVENTION

1. Field of the Invention

The present invention relates to an optical scanning device, and more particularly to an optical scanning device that emits a plurality of light beams concurrently to a photosensitive member.

2. Description of Related Art

Figure 10:
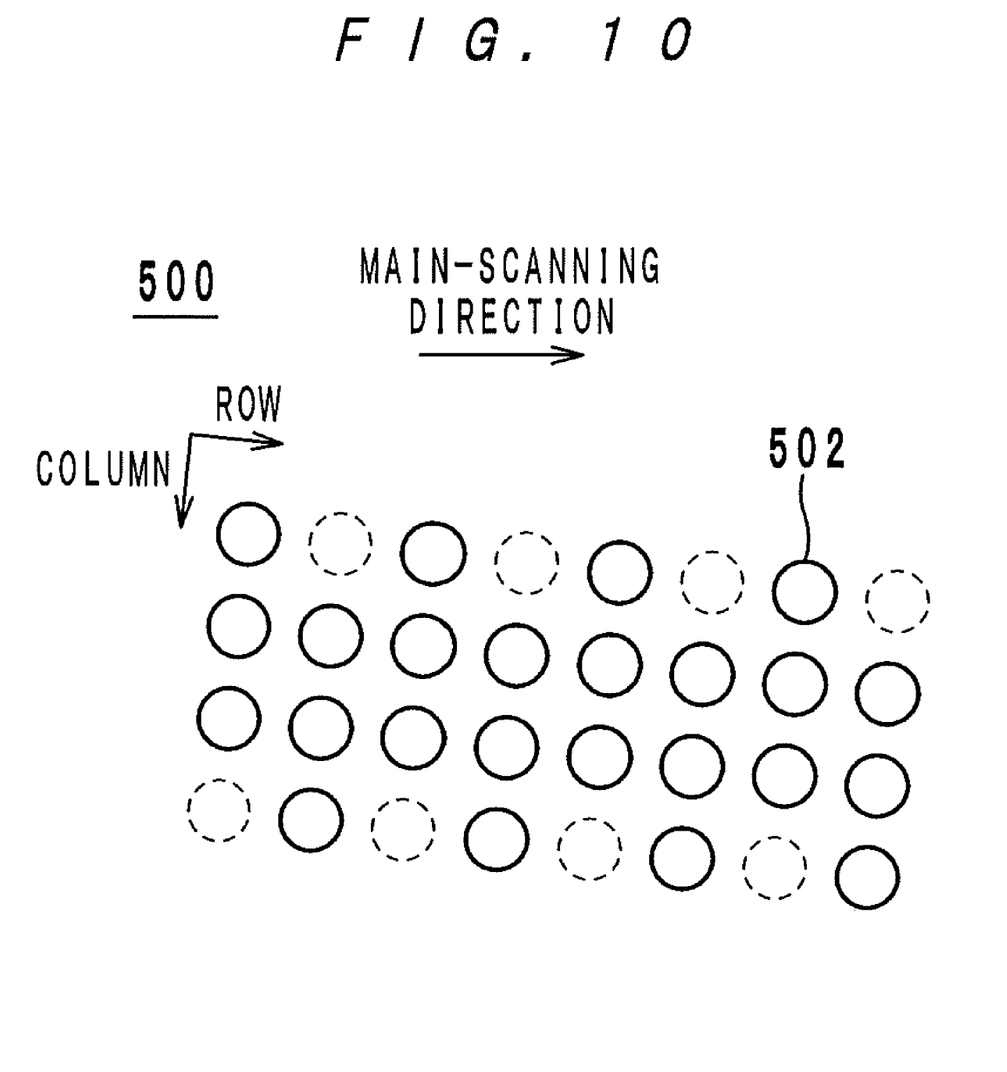
FIG. 10 shows arrangement of light emitting elements in a light source section of a multi-beam scanning device disclosed by Japanese Patent Laid-Open Publication No. 2007-168299.

A multi-beam scanning device disclosed by Japanese Patent Laid-Open Publication No. 2007-168299 (Reference 1) is an example of optical scanning devices having measures to reduce density unevenness due to reciprocity failure. FIG. 10 shows arrangement of light emitting elements in a light source section 500 of the multi-beam scanning device disclosed by Reference 1.

As shown by FIG. 10, in the light source section 500 of the multi-beam scanning device disclosed by Reference 1, a multiple of light emitting elements 502 are arranged in a matrix of four rows and eight columns. The longer sides of the matrix slant slightly from a main-scanning direction so that beams emitted from the light emitting elements 502 will be scanned on different scanning lines. Also, among the eight light emitting elements 502 in the first row, four light emitting elements 502 located in the columns of even numbers, actually, do not emit light. Likewise, among the eight light emitting elements 502 in the fourth row, four light emitting elements 502 located in the columns of odd numbers do not emit light. With the light source section 500 of this structure, the multi-beam scanning device disclosed by Reference 1 can irradiate a photosensitive member with a plurality of beams concurrently while reducing density unevenness due to reciprocity failure.

An ordinary optical scanning device for scanning a photosensitive member with a plurality of beams concurrently is structured such that an area irradiated with beams at the time of the Lth scanning motion and an area irradiated with beams at the time of the (L+1)th scanning motion will not overlap. However, when such an ordinary optical scanning device is used, actually, a scanning line located at the most downstream in the sub-scanning direction during the Lth scanning motion is inevitably superimposed during the (L+1)th scanning motion. Then, due to reciprocity failure, this scanning line becomes thicker than the other scanning lines, and density unevenness is caused. Thus, when one scanning line is especially thicker, the line is apt to be recognized as a thick stripe by users.

The multi-beam scanning device disclosed by Reference 1 is so structured that the area irradiated with beams during Lth scanning motion and the area irradiated with beams during (L+1)th scanning motion overlap with each other. More specifically, scanning lines on which the beams emitted from the four light emitting elements 502 in the first row at the time of the (L+1)th scanning motion are located among scanning lines on which the beams emitted from the four light emitting elements 502 in the fourth row at the time of the Lth scanning motion.

Therefore, since the four scanning lines on which the beams emitted from the four light emitting elements 502 in the fourth row are scanned during the Lth scanning motion are superimposed, these scanning lines become thicker due to reciprocity failure. On the contrary, the four scanning lines on which the beams emitted from the four light emitting elements 502 in the first row are scanned during the (L+1)th scanning motion are thinner than the four scanning lines on which the beams emitted from the four light emitting elements 502 in the fourth row are scanned during the Lth scanning motion. Further, the thicker scanning lines, which are made by the beams emitted from the four light emitting elements 502 in the fourth row during the Lth scanning motion, and the thinner scanning lines, which are made by the beams emitted from the four light emitting elements 502 in the first row during the (L+1)th scanning motion, are arranged alternately. Thereby, the density unevenness in an image formed by use of the multi-beam scanning device disclosed by Reference 1 is seen gentle, compared with an image formed by an ordinary optical scanning device. Thus, in an image formed by use of the multi-beam scanning device disclosed by Reference 1, density unevenness due to reciprocity failure is less likely to be recognized as stripes, compared with an image formed by an ordinary optical scanning device.

However, in the multi-beam scanning device disclosed by Reference 1, some of the light emitting elements 502 in the first row and in the fourth row actually do not emit light. Therefore, although the light source section 500 consumes a space for 32 light emitting elements, actually only 24 light emitting elements 502 emit light. Thus, the multi-beam scanning device disclosed by Reference 1 has a problem that the light source section 500 consumes a space unnecessarily and becomes large. When the light source section 500 is large, the beams emitted from the light source section 500 will pass through the peripheral portions of a collimator lens and a cylindrical lens as well as the central portions thereof. The peripheral portions of the collimator lens and the cylindrical lens have greater aberrations than the central portions thereof. Therefore, it is desired that the light source section 500 is downsized such that the beams will pass through the central portions of the collimator lens and the cylindrical lens.

SUMMARY OF THE INVENTION

An object of the present invention is to provide an optical scanning device that has a downsized light source section and that can reduce density unevenness due to reciprocity failure.

According to a first aspect of the present invention, an optical scanning device to be employed in an image forming apparatus comprising a photosensitive member that is scanned with a plurality of beams, said optical scanning device comprising: a plurality of light emitting elements that are arranged in an area of a parallelogram, in a matrix of M rows and N columns, all the light emitting elements emitting beams; and a deflector for deflecting the beams emitted from the light emitting elements; wherein the plurality of light emitting elements are arranged such that the beam emitted from the light emitting element located in the mth row and the nth column and the beam emitted from the light emitting element located in the (m−1)th row and the (n+1)th column are scanned on adjacent scanning lines on the photosensitive member; and wherein a scanning line on which the beam emitted from the light emitting element in the first row and the first column is scanned at a time of the (L+1)th scanning motion of the light emitting elements is located in an area from a scanning line on which the beam emitted from the light emitting element in the first row and the first column is scanned at a time of the Lth scanning motion of the light emitting elements to a scanning line on which the beam emitted from the light emitting element in the Mth row and the Nth column is scanned at a time of the Lth scanning motion of the light emitting elements.

According to a second aspect of the present invention, an optical scanning method to be carried out in an image forming apparatus comprising a photosensitive member that is scanned with a plurality of beams, said optical scanning method comprising the steps of: emitting a plurality of beams from a plurality of light emitting elements that are arranged in an area of a parallelogram, in a matrix of M rows and N columns; and deflecting the beams emitted from the light emitting elements; wherein the plurality of light emitting elements are arranged such that the beam emitted from the light emitting element located in the mth row and the nth column and the beam emitted from the light emitting element located in the (m−1)th row and the (n+1)th column are scanned on adjacent scanning lines on the photosensitive member; and wherein a scanning line on which the beam emitted from the light emitting element in the first row and the first column is scanned at a time of the (L+1)th scanning motion of the light emitting elements is located in an area from a scanning line on which the beam emitted from the light emitting element in the first row and the first column is scanned at a time of the Lth scanning motion of the light emitting elements to a scanning line on which the beam emitted from the light emitting element in the Mth row and the Nth column is scanned at a time of the Lth scanning motion of the light emitting elements.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

An optical scanning device according to an embodiment of the present invention is described with reference to the accompanying drawings.

Structure of Image Forming Apparatus

Figure 1:
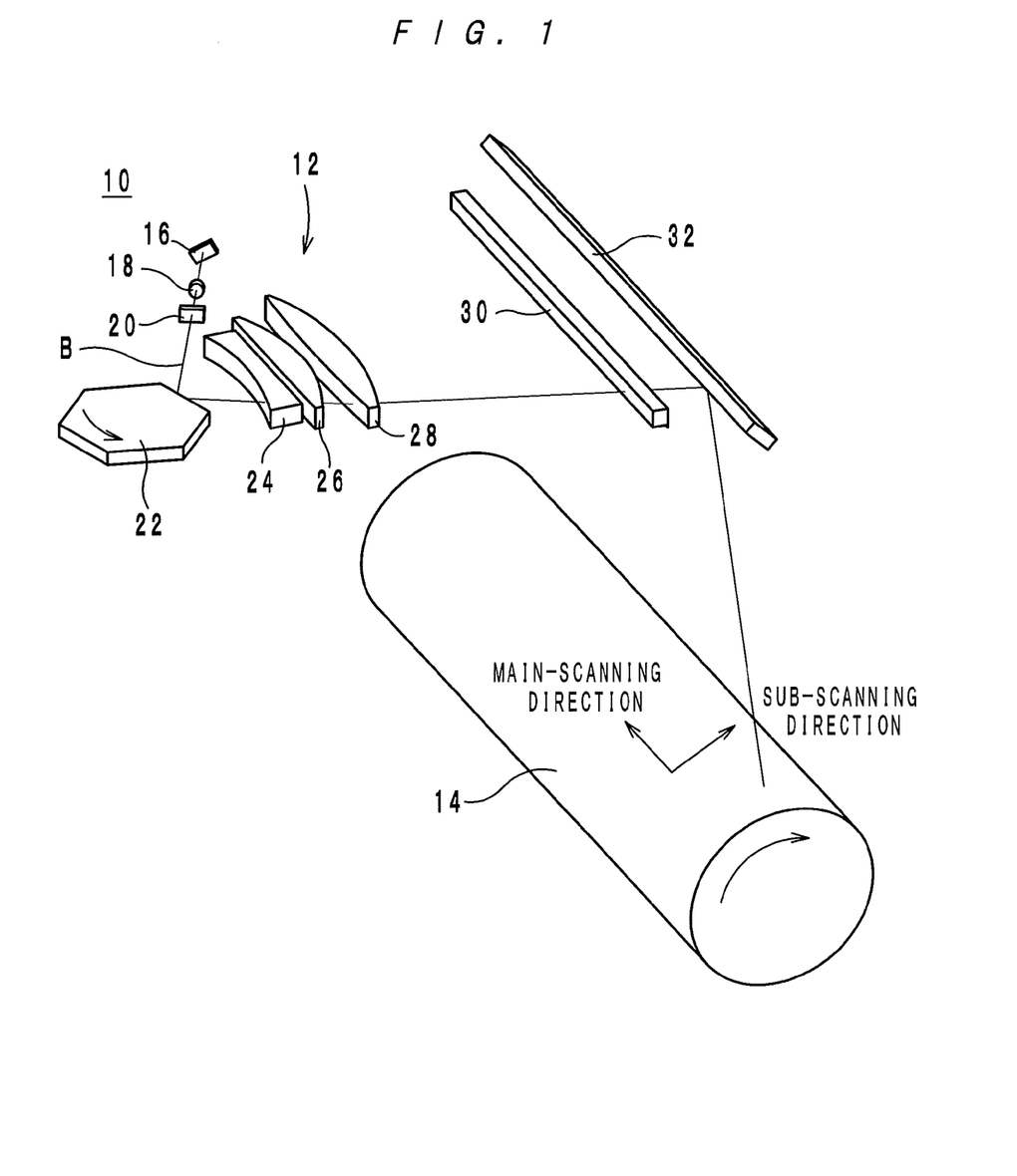
FIG. 1 is a perspective view of an optical scanning device according to an embodiment of the present invention, which is suited to be used for an image forming apparatus, and a photosensitive drum.

FIG. 1 is a perspective view of an optical scanning device 12 according to an embodiment of the present invention and a photosensitive drum 14 comprised in an image forming apparatus 10.

The image forming apparatus 10 comprises a developing device, a fixing device and other elements as well as the optical scanning device 12 and the photosensitive drum 14. These elements are well-known types, and descriptions thereof are omitted.

The optical scanning device 12 comprises a light source section 16, a collimator lens 18, a cylindrical lens 20, a deflector 22, a scanning lenses 24, 26, 28 and 30, and a deflecting mirror 32. The light source section 16 emits a plurality of beams B concurrently. In FIG. 1, however, only one beam B is shown for simplification.

The collimator lens 18 shapes the beams B emitted from the light source section 16 into substantially parallel bundles of rays. The cylindrical lens 20 operates such that the beams B converge into linear shapes on reflecting surfaces of the deflector 22.

The deflector 22, which comprises a polygon mirror and a motor (not shown in FIG. 1) for driving the polygon mirror, deflects the beams B. The scanning lenses 24, 26, 28 and 30 image the deflected beams B on the surface of the photosensitive drum 14.

The photosensitive drum 14 is cylindrical, and the surface of the photosensitive drum 14 is charged by a charger (not shown). Then, the surface of the photosensitive drum 14 is scanned with the beams B, and thereby, an electrostatic latent image is formed on the surface of the photosensitive drum 14. The deflecting mirror 32 directs the beams B that passed through the scanning lens 30 to the photosensitive drum 14.

Structure of the Light Source Section

Figure 2A:
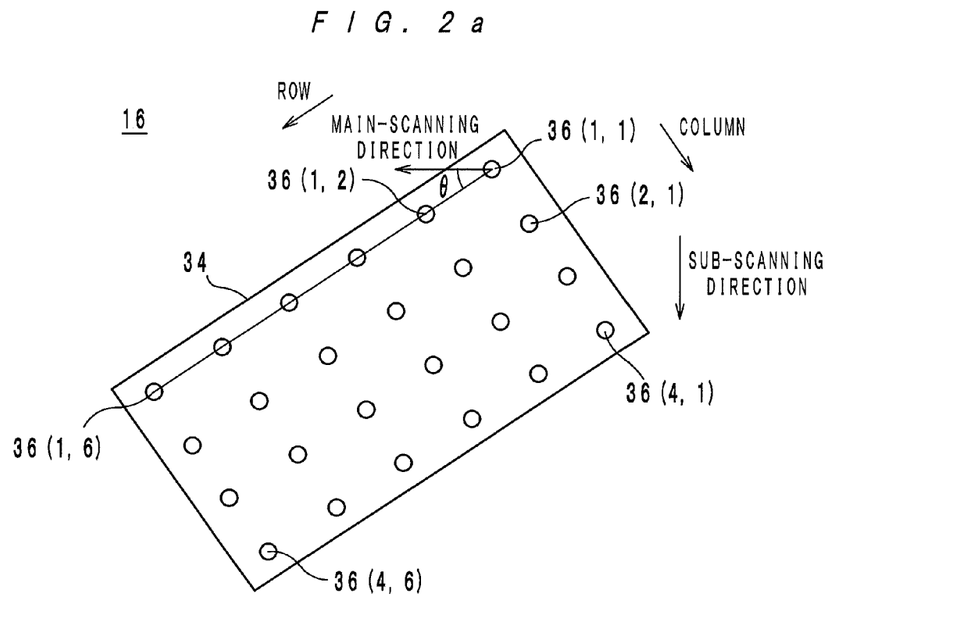
FIGS. 2a and 2b show a light source section of the optical scanning device, FIG. 2a being a plan view of the light source section viewed in a light traveling direction, and FIG. 2b being a plan view of scanning lines on which beams emitted from the light source section are scanned on the photosensitive drum.
Figure 2B:
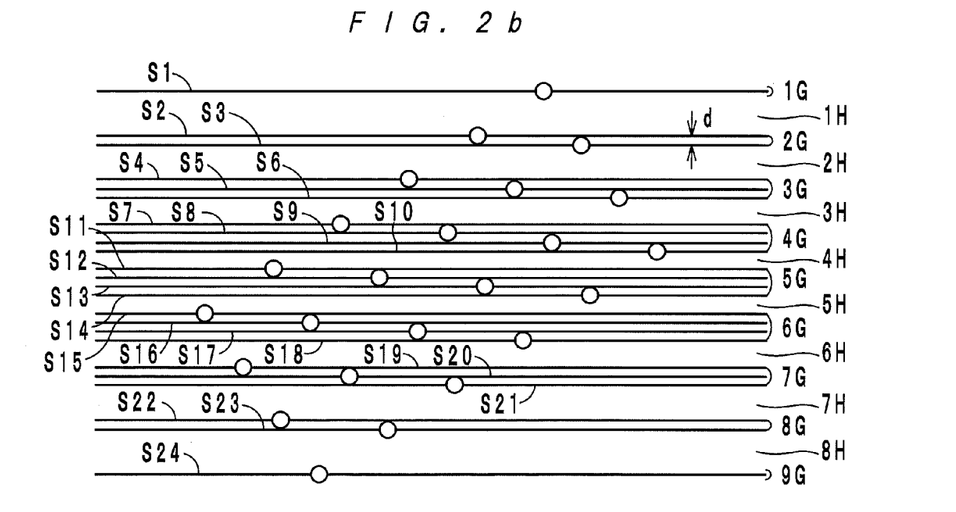

Now, the light source section 16 is described with reference to the drawings. FIG. 2a is a plan view of the light source section 16, viewed from the traveling direction of the beams B. FIG. 2b shows scanning lines S1 to S24 where the beams B emitted from the light source section 16 are scanned on the photosensitive drum 14.

The light source section 16 comprises a board 34 and light emitting elements 36 (1, 1) to 36 (4, 6). The board 34 is a rectangular circuit board, on which the light emitting elements 36 are mounted. Therefore, the board 34 has a printed wiring for supplying electric power to the light emitting elements 36.

The light emitting elements 36 (1, 1) to 36 (4, 6) are arranged within a rectangular area of the board 34, in a matrix of four rows and six columns, and every light emitting element 36 emits a beam B. The board 34 is disposed slantwise such that the longer sides of the rectangular area where the light emitting elements 36 are arranged are at an angle θ to the main-scanning direction. This will be described below. The light emitting element 36 (m, n) means the light emitting element located in the mth row and the nth column.

The light emitting elements 36 (1, 1) to 36 (4, 6) are arranged such that the beam B emitted from the light emitting element 36 (m, n) located in the mth row and the nth column and the beam B emitted from the light emitting element 36 (m−1, n+1) located in the (m−1)th row and the (n+1)th column will be scanned on the photosensitive drum 14, on adjacent two scanning lines with respect to the sub-scanning direction. For example, as shown in FIG. 2b, the beam B emitted from the light emitting element 36 (1, 2) is scanned on the scanning line S2 on the surface of the photosensitive drum 14, and the beam B emitted from the light emitting element 36 (2, 1) is scanned on the scanning line S3 on the surface of the photosensitive drum 14. The scanning lines S2 and S3 are adjacent to each other.

Further, the light emitting elements 36 (1, 1) to 36 (4, 6) are arranged such that all the beams B emitted from the light emitting elements 36 will be scanned on different scanning lines. That is, the light emitting elements 36 (1, 1) to 36 (4, 6) are located in different positions with respect to the sub-scanning direction. Accordingly, as shown by FIG. 2b, the beams B emitted from the 24 light emitting elements 36 (1, 1) to 36 (4, 6) are scanned on 24 scanning lines S1 to S24.

Now, arrangement of the scanning lines S1 to S24 is described. As shown by FIG. 2b, the scanning lines S1 to S24 are not arranged at uniform intervals. Specifically, the scanning lines S1 to S24 are divided into nine groups 1G to 9G. The group 1G includes only one scanning line S1. The group 2G includes two scanning lines S2 and S3. The group 3G includes three scanning lines S4 to S6. The group 4G includes four scanning lines S7 to S10. The group 5G includes four scanning lines S11 and S14. The group 6G includes four scanning lines S15 to S18. The group 7G includes three scanning lines S19 to S21. The group 8G includes two scanning lines S22 and S23. The group 9G includes only one scanning line S24. Thus, as the group number changes from 1G to 4G one by one, the number of scanning lines included in the group increases sequentially from one to four. The group 5G includes four scanning lines. As the group number changes from 6G to 7G one by one, the number of scanning lines included in the group decreases sequentially from four to one.

The intervals between scanning lines in the same group are equal to the intervals d in the sub-scanning direction among the scanning lines finally made on the photosensitive drum 14 to complete an image. The gaps 1H to 8H among the groups 1G to 9G are larger than the intervals d. Specifically, the gap 1H between the group 1G and the group 2G is 5d. The gap 2H between the group 2G and the group 3G is 4d. The gap 3H between the group 3G and the group 4G is 3d. The gap 4H between the group 4G and the group 5G is 2d. The gap 5H between the group 5G and 6G is 2d. The gap 6H between the group 6G and 7G is 3d. The gap 7H between the group 7G and 8G is 4d. The gap 8H between the group 8G and 9G is 5d.

Now, the arrangement of the scanning lines is generalized by using a matrix of M rows and N columns. When the light emitting elements 36 (1, 1) to 36 (M, N) are arranged in a matrix of M rows and N columns, there are (M×N) scanning lines. The (M×N) scanning lines are divided into groups 1G to (M+N−1)G traversing the sub-scanning direction. The number of scanning lines included in each of the groups 1G to NG is any of one to N. The number of scanning lines included in each of the groups (N+1)G to (M−1)G is N. The number of scanning lines included in each of the groups MG to (M+N−1)G is any of one to N. More specifically, as the group number increases from 1G to NG one by one, the number of scanning lines included in the group increases one by one. The number of scanning lines included in each of the groups from (N+1)G to (M−1)G is N. As the group number decreases from MG to (M+N−1)G one by one, the number of scanning lines included in the group decreases from N one by one.

Scanning of Beams

Figure 3:
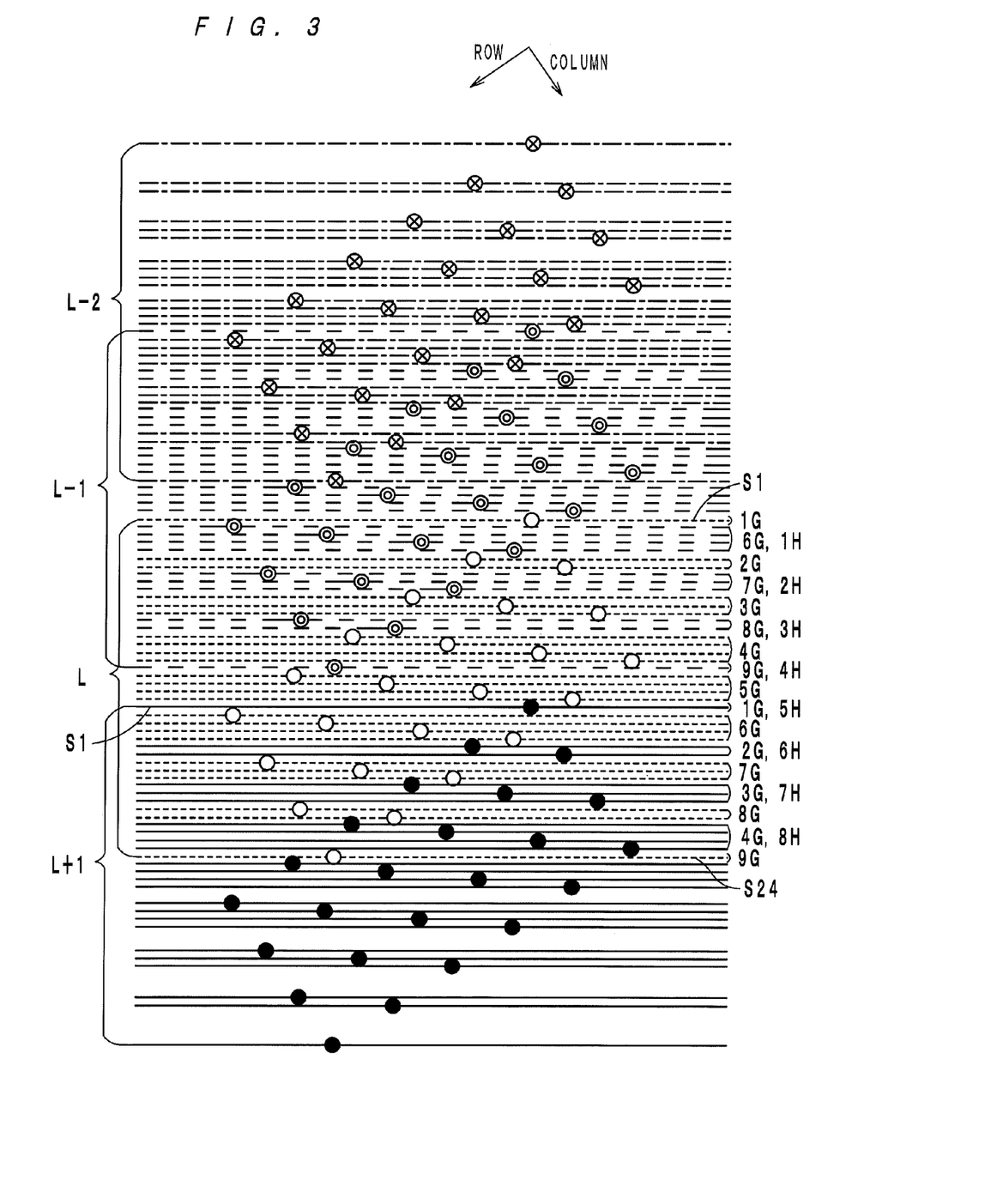
FIG. 3 shows scanning lines on which beams are scanned while the optical scanning device makes the (L−2)th scanning motion to the (L+1)th scanning motion.

Now, scanning of beams B by use of the above-described light source section 16 is described, with reference to the drawings. FIG. 3 shows scanning lines on which the beams B are scanned while the optical scanning device 12 makes the (L−2)th scanning motion to the (L+1)th scanning motion. In FIG. 3, the circles with crosses therein show the beams B scanned on the photosensitive drum 14 during the (L−2)th scanning motion, and the alternate long and short dash lines show the scanning lines on which the beams B are scanned during the (L−2)th scanning motion. The double circles show the beams B scanned on the photosensitive drum 14 during the (L−1)th scanning motion, and the dash lines show the scanning lines on which the beams B are scanned during the (L−1)th scanning motion. The blank circles show the beams B scanned on the photosensitive drum 14 during the Lth scanning motion, and the dotted lines show the scanning lines on which the beams B are scanned during the Lth scanning motion. The filled circles show the beams B scanned on the photosensitive drum 14 during the (L+1)th scanning motion, and the solid lines show the scanning lines on which the beams B are scanned during the (L+1)th scanning motion.

In the optical scanning device 12 according to this embodiment, as shown by FIG. 3, the scanning line S1 on which the beam B emitted from the light emitting element 36 (1, 1) is scanned during the (L+1)th scanning motion of the light emitting elements 36 (1, 1) to 36 (4, 6) is located within an area between the scanning line S1 on which the beam B emitted from the light emitting element 36 (1, 1) is scanned during the Lth scanning motion and the scanning line S24 on which the beam B emitted from the light emitting element 36 (4, 6) is scanned during the Lth scanning motion. That is, the area where the beams B emitted from the light emitting elements 36 (1, 1) to 36 (4, 6) are scanned during the (L+1)th scanning motion overlap with the area where the beams B emitted from the light emitting elements 36 (1, 1) to 36 (4, 6) are scanned during the Lth scanning motion. However, the scanning lines S1 to S24 on which the beams B emitted from the light emitting elements 36 (1, 1) to 36 (4, 6) are scanned during the (L+1)th scanning motion do not overlap with the scanning lines S1 to S24 on which the beams B emitted from the light emitting elements 36 (1, 1) to 36 (4, 6) are scanned during the Lth scanning motion. This is described in more detail below.

As shown by FIG. 2b, the scanning lines S1 to S24 of the beams B during the Lth scanning motion are not at uniform intervals. That is, as described above, there are different gaps 1H to 8H from 2d to 5d among the groups 1G to 9G. In the optical scanning device 12 according to this embodiment, the gaps 1H to 8H made during the Lth scanning motion are filled by the (L−1)th scanning motion and the (L+1)th scanning motion.

More specifically, the scanning line S24 in the group 9G during the (L−1)th scanning motion is located in the gap 4H made during the Lth scanning motion. Since the gap 4H is 2d, the location of the one scanning line S24 at the time of the (L−1)th scanning motion permits uniform intervals among scanning lines in the gap 4H. The scanning lines S22 and S23 in the group 8G during the (L−1)th scanning motion are located in the gap 3H made during the Lth scanning motion. Since the gap 3H is 3d, the locations of the two scanning lines S22 and S23 at the time of the (L−1)th scanning motion permits uniform intervals among scanning lines in the gap 3H. The scanning lines S19 to S21 in the group 7G during the (L−1)th scanning motion are located in the gap 2H. Since the gap a1 is 4d, the locations of the three scanning lines S19 to S21 at the time of the (L−1)th scanning motion permits uniform intervals among scanning lines in the gap 2H. The scanning lines S15 to S18 in the group 6G during the (L−1)th scanning motion are located in the gap 1H made during the Lth scanning motion. Since the gap 1l1 is 5d, the locations of the four scanning lines S15 to S18 at the time of the (L−1)th scanning motion permits uniform intervals among scanning lines in the gap 1H.

Further, as shown by FIG. 3, the scanning line S1 in the group 1G during the (L+1)th scanning motion is located in the gap 5H made during the Lth scanning motion. Since the gap 5H is 2d, the location of the one scanning line S1 at the time of the (L+1)th scanning motion permits uniform intervals among scanning lines in the gap 5H. The scanning lines S2 and S3 in the group 2G during the (L+1)th scanning motion are located in the gap 6H made during the Lth scanning motion. Since the gap 6H is 3d, the locations of the two scanning lines S2 and S3 at the time of the (L+1)th scanning motion permits uniform intervals among scanning lines in the gap 6H. The scanning lines S4 to S6 in the group 3G during the (L+1)th scanning motion are located in the gap 7H made during the Lth scanning motion. Since the gap 7H is 4d, the locations of the three scanning lines S4 to S6 at the time of the (L+1)th scanning motion permits uniform intervals among scanning lines in the gap 7H. The scanning lines S7 to S10 in the group 4G during the (L+1)th scanning motion are located in the gap 8H made during the Lth scanning motion. Since the gap 8H is 5d, the locations of the four scanning lines S7 to S10 at the time of the (L+1)th scanning motion permits uniform intervals among scanning lines in the gap 8H.

The beams B emitted from the light emitting elements 36 (1, 1) to 36 (4, 6) are scanned in the above-described way repeatedly, and thereby, an electrostatic latent image with scanning lines arranged at uniform intervals can be formed.

Advantages

In the optical scanning device 12 of the structure above, density unevenness due to reciprocity failure can be reduced. More specifically, in the gaps 5H to 8H made during the Lth scanning motion, the scanning line groups 1G to 4G at the time of the (L+1)th scanning motion are located, respectively. In other words, the scanning line groups 5G to 9G at the time of the Lth scanning motion are adjacent to the scanning line group 1G to 4G at the time of the (L+1)th scanning motion, respectively. Thus, due to reciprocity failure, the density of the scanning lines S11 to S24 in the groups 5G to 9G at the time of the Lth scanning motion become thicker than the density of the scanning lines S1 to S10 in the groups 1G to 4G at the time of the (L+1)th scanning motion.

However, since the scanning line groups 5G to 9G at the time of the Lth scanning motion and the scanning line groups 1G to 4G at the time of the (L+1)th scanning motion are alternately arranged in the sub-scanning direction, the density difference between the groups 5G to 9G and the groups 1G to 4G blurs. Consequently, in the optical scanning device 12, it is less likely that density unevenness due to reciprocity failure is seen as stripes by users, compared with those in conventional optical scanning devices.

In the optical scanning device 12, density unevenness due to reciprocity failure can be reduced effectively for the reason below. In the optical scanning device 12, the scanning lines in the groups 5G to 9G at the time of the Lth scanning motion become thicker due to reciprocity failure as described above, and the number of scanning lines in each of the groups 5G to 9G is increasing as the group is located more upstream in the sub-scanning direction. On the other hand, in the multi-beam scanning device disclosed by Japanese Patent Laid-Open Publication No. 2007-168299, scanning lines that become thicker and scanning lines that become thinner are arranged alternately one by one. Thus, compared with a case of using the multi-beam scanning device disclosed by Japanese Patent Laid-Open Publication No. 2007-168299, an image with gradually changing density can be formed by using the optical scanning device 12. Consequently, compared with an image formed by use of the multi-beam scanning device disclosed by Japanese Patent Laid-Open Publication No. 2007-168299, in an image formed by use of the optical scanning device 12, it is less likely that density unevenness due to reciprocity failure is seen as stripes.

Further, the structure of the optical scanning device 12 permits downsizing of the light source section 16 as described below. In the optical scanning device 12, the light emitting elements 36 (1, 1) to 36 (4, 6) are arranged such that none of the beams B are scanned on the same scanning line. From the (L−2)th scanning motion to the (L+1)th scanning motion, the scanning lines S1 to S24 do not overlap with one another. Therefore, all the light emitting elements 36 (1, 1) to 36 (4, 6) contribute to formation of an electrostatic latent image. In other words, there is no useless space in the light source section 16, and the light source section 16 is downsized.

In the optical scanning device 12, the arrangement of the light emitting elements 36 in the light source section 16 is not necessarily to be that shown by FIG. 12. In the following, modifications of the light source section 16 are described.

First Modification

Figure 4:
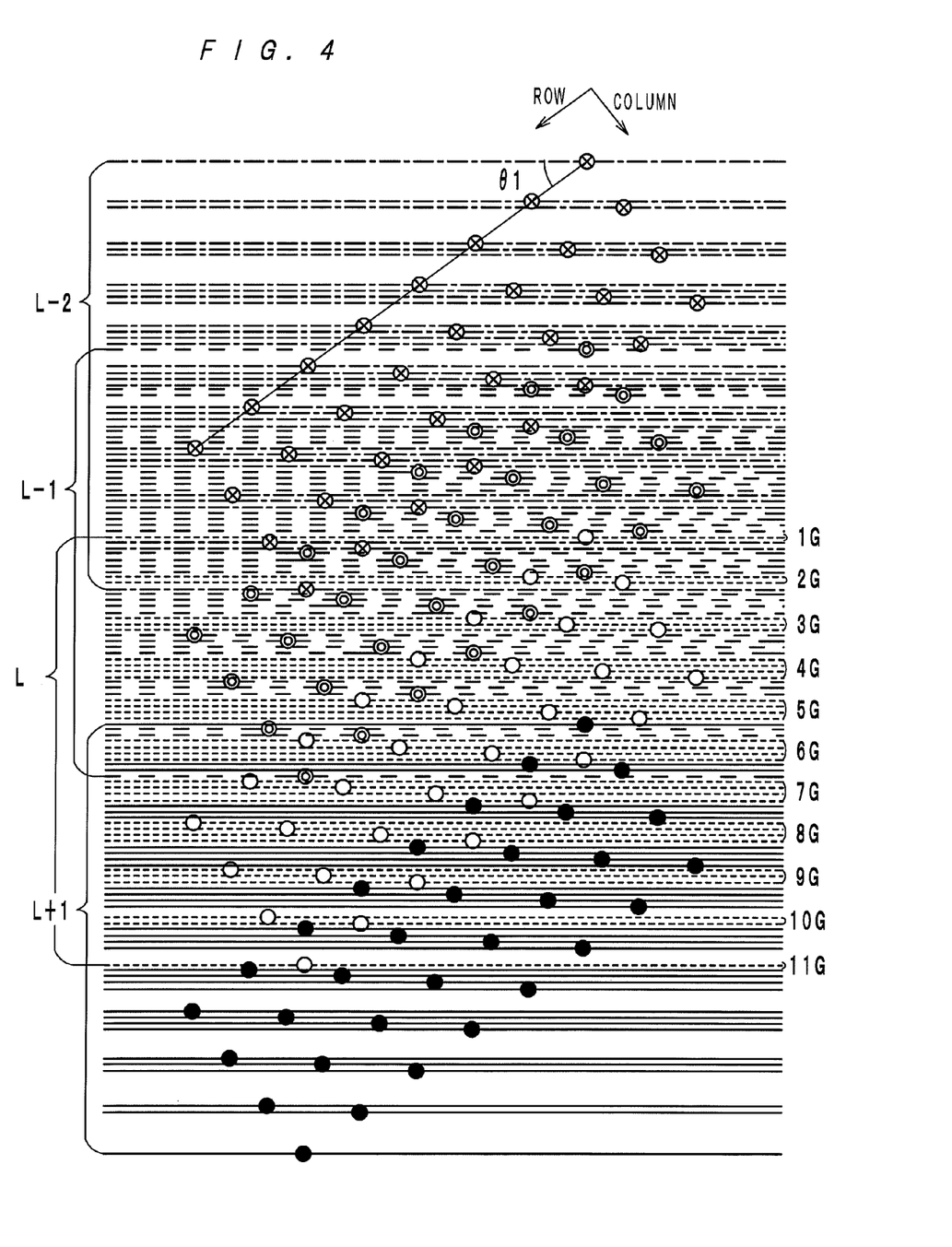
FIG. 4 shows scanning lines on which beams emitted from a first modified light source section are scanned while the optical scanning device makes the (L−2)th scanning motion to the (L+1)th scanning motion.

A first modified light source section 16a is described with reference to the drawings. FIG. 4 shows scanning lines on which beams B emitted from the first modified light source section 16a are scanned from the (L−2)th scanning motion to the (L+1)th scanning motion.

In the light source section 16a, as shown in FIG. 4, light emitting elements 36 are arranged in a matrix of four rows and eight columns, and every light emitting element 36 emits a beam B. The number of columns in the first modified light source section 16a is larger than that in the light source section 16, and gaps made at the time of the Lth scanning motion are filled with scanning lines at the times of the (L−2)th scanning motion, the (L−1)th scanning motion, the (L+1)th scanning motion and the (L+2)th scanning motion (not shown). Consequently, in an image formed by use of the optical scanning device 12 provided with the first modified light source section 16a, density unevenness due to reciprocity failure is less visible.

Second Modification

Figure 5:
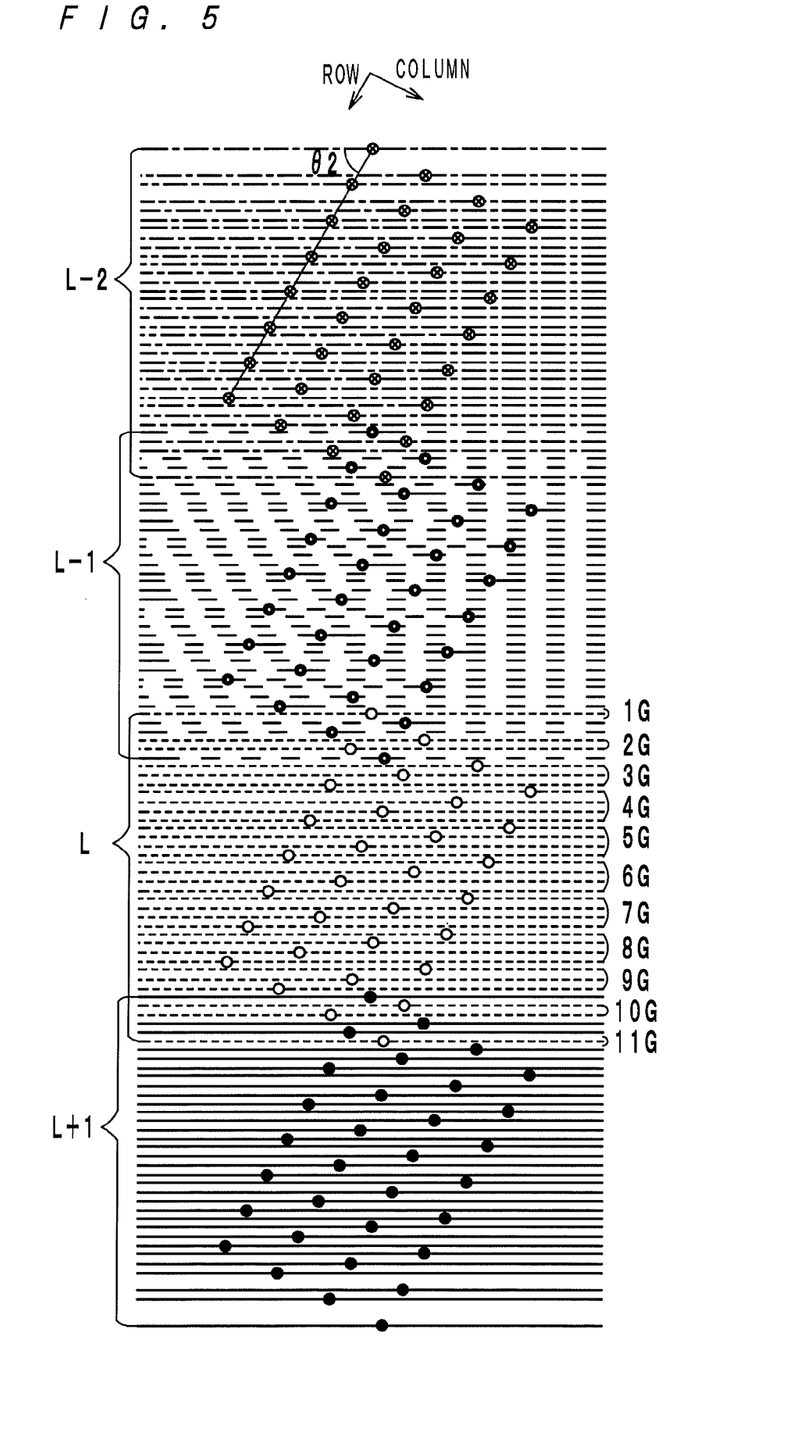
FIG. 5 shows scanning lines on which beams emitted from a second modified light source section are scanned while the optical scanning device makes the (L−2)th scanning motion to the (L+1)th scanning motion.

A second modified light source section 16b is described with reference to the drawings. FIG. 5 shows scanning lines on which beams B emitted from the second modified light source section 16b are scanned from the (L−2)th scanning motion to the (L+1)th scanning motion.

The light source section 16b is different from the light source section 16a in the slanting angle. The light source section 16a is disposed slantwise such that the longer sides of the rectangular area where the light emitting elements 36 are arranged are at an angle θ1 to the main-scanning direction. The light source section 16b is disposed slantwise such that the longer sides of a rectangular area where the light emitting elements 36 are arranged are at an angle θ2 to the main scanning direction. The angle θ2 is larger than the angle θ1.

In a case of using the second modified light source section 16b, there are no gaps among the groups 3G to 9G, and in an image formed by use of the second modified light source section 16b, the scanning lines S4 to S28 during one scanning motion are arranged adjacent to one another.

The optical scanning device 12 provided with the second modified light source section 16b also has the same advantages as the optical scanning device 12 provided with the light source section 16 shown by FIG. 2. The optical scanning device 12 provided with the second modified light source section 16b reduces density unevenness due to reciprocity failure, and the light source section 16b is downsized.

Third Embodiment

Figure 6:
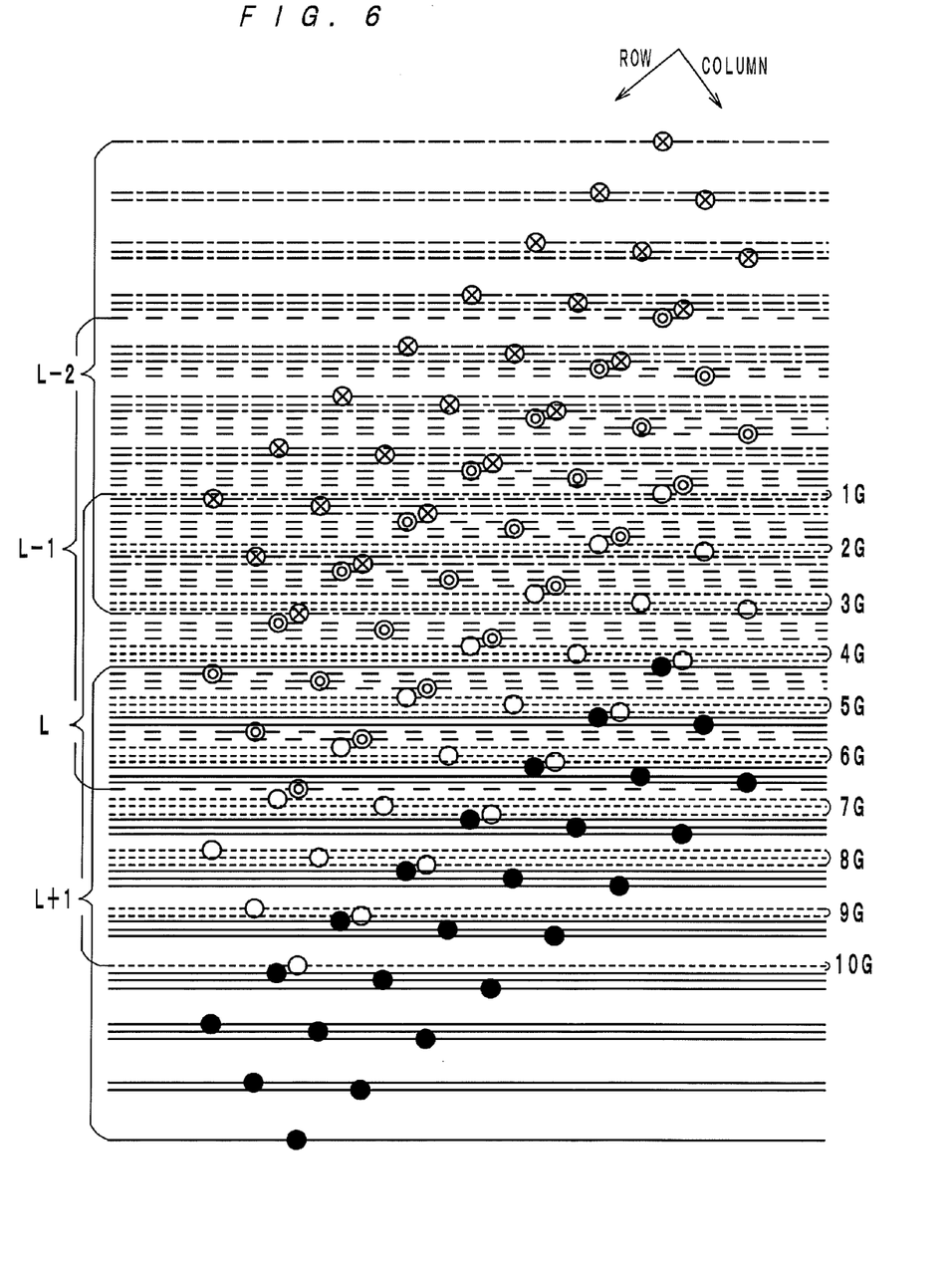
FIG. 6 shows scanning lines on which beams emitted from a third modified light source section are scanned while the optical scanning device makes the (L−2)th scanning motion to the (L+1)th scanning motion.

A third modified light source section 16c is described with reference to the drawings. FIG. 6 shows scanning lines on which beams B emitted from the third modified light source section 16c are scanned from the (L−2)th scanning motion to the (L+1)th scanning motion.

In the light source section 16c, as shown in FIG. 6, light emitting elements 36 are arranged in a matrix of three rows and eight columns, and every light emitting element 36 emits a beam B. The number of columns in the third modified light source section 16c is larger than that in the light source section 16, and gaps made at the time of the Lth scanning motion are filled with scanning lines at the times of the (L−2)th scanning motion, the (L−1)th scanning motion, the (L+1)th scanning motion and the (L+2)th scanning motion (not shown). In an image formed by use of the optical scanning device 12 provided with the third modified light source section 16c, the overlap areas that are subjected to a plurality of scanning motions are large, and the overlap areas include areas subjected to three scanning motions as well as areas subjected to two scanning motions. Therefore, it is possible to make the scanning lines denser.

Fourth Modification

Figure 7:
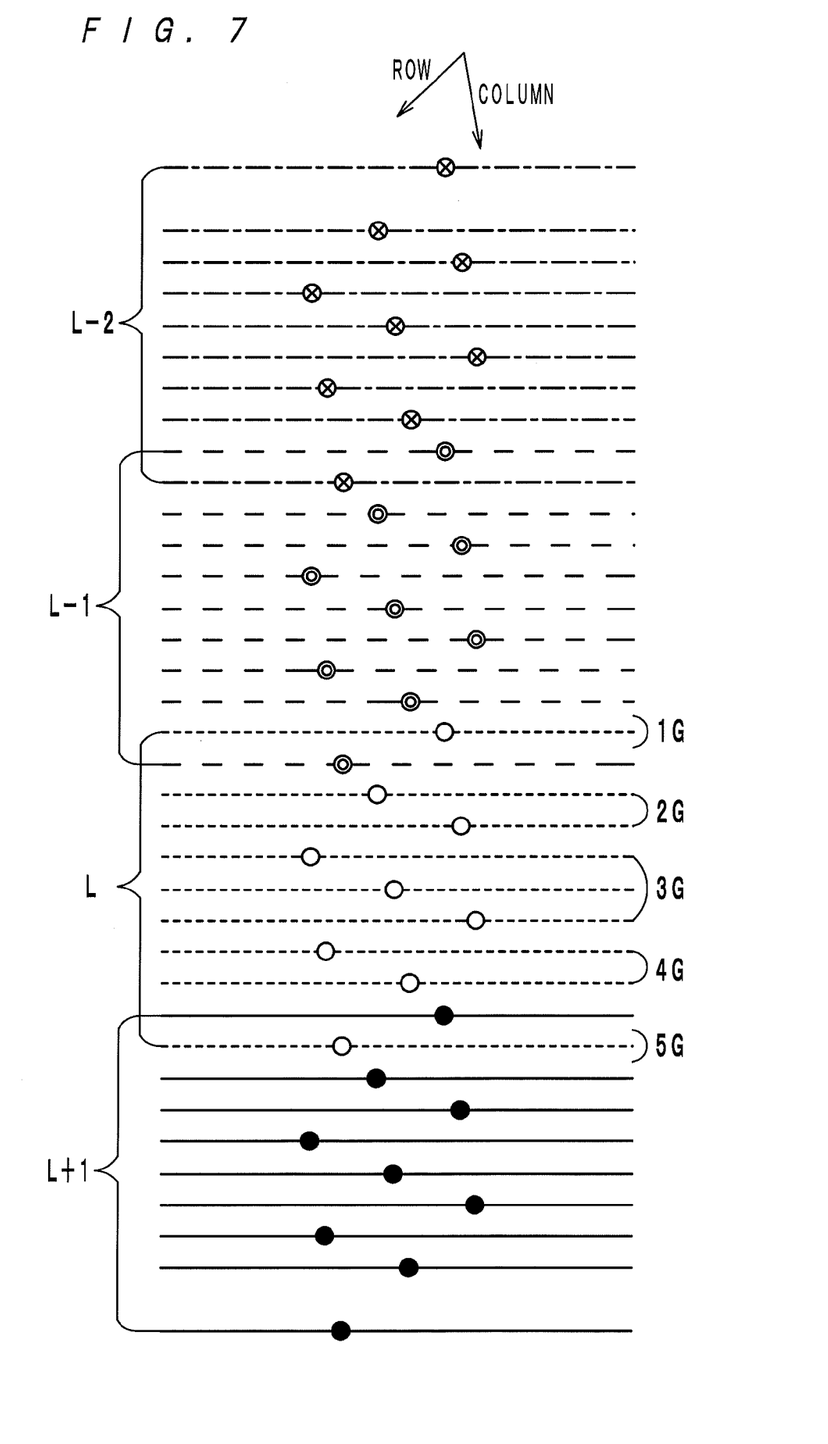
FIG. 7 shows scanning lines on which beams emitted from a fourth modified light source section are scanned while the optical scanning device makes the (L−2)th scanning motion to the (L+1)th scanning motion.

A fourth modified light source section 16d is described with reference to the drawings. FIG. 7 shows scanning lines on which beams B emitted from the fourth modified light source section 16d are scanned from the (L−2)th scanning motion to the (L+1)th scanning motion.

In the light source section 16d, as shown in FIG. 7, light emitting elements 36 are arranged in an area of a parallelogram, in a matrix of three rows and three columns, and four adjacent light emitting elements 36 make a diamond shape composed of two equilateral triangles. Every light emitting element 36 emits a beam B.

The optical scanning device 12 provided with the fourth modified light source section 16d also has the same advantages as the optical scanning device 12 provided with the light source section 16 shown by FIG. 2. The optical scanning device 12 provided with the fourth modified light source section 16d reduces density unevenness due to reciprocity failure, and the light source section 16d is downsized.

In the optical scanning device 12 provided with the light source section 16d, downsizing is possible while thermal interactions among light emitting elements 36 adjacent to each other can be reduced. It is generally preferred that the light emitting elements 36 are arranged at minimum intervals as long as the intervals are large enough that thermal interactions among the light emitting elements 36 do not cause a problem. In the light source section 16 shown by FIG. 2, around one light emitting element 36, four light emitting elements 36 are arranged at such minimum intervals. In the light source section 16d shown in FIG. 7, six light emitting elements are arranged at such minimum intervals. Therefore, in the light source section 16d shown in FIG. 7, it is possible to arrange the light emitting elements 36 more densely while reducing the thermal interactions thereamong.

Fifth Modification

Figure 8:
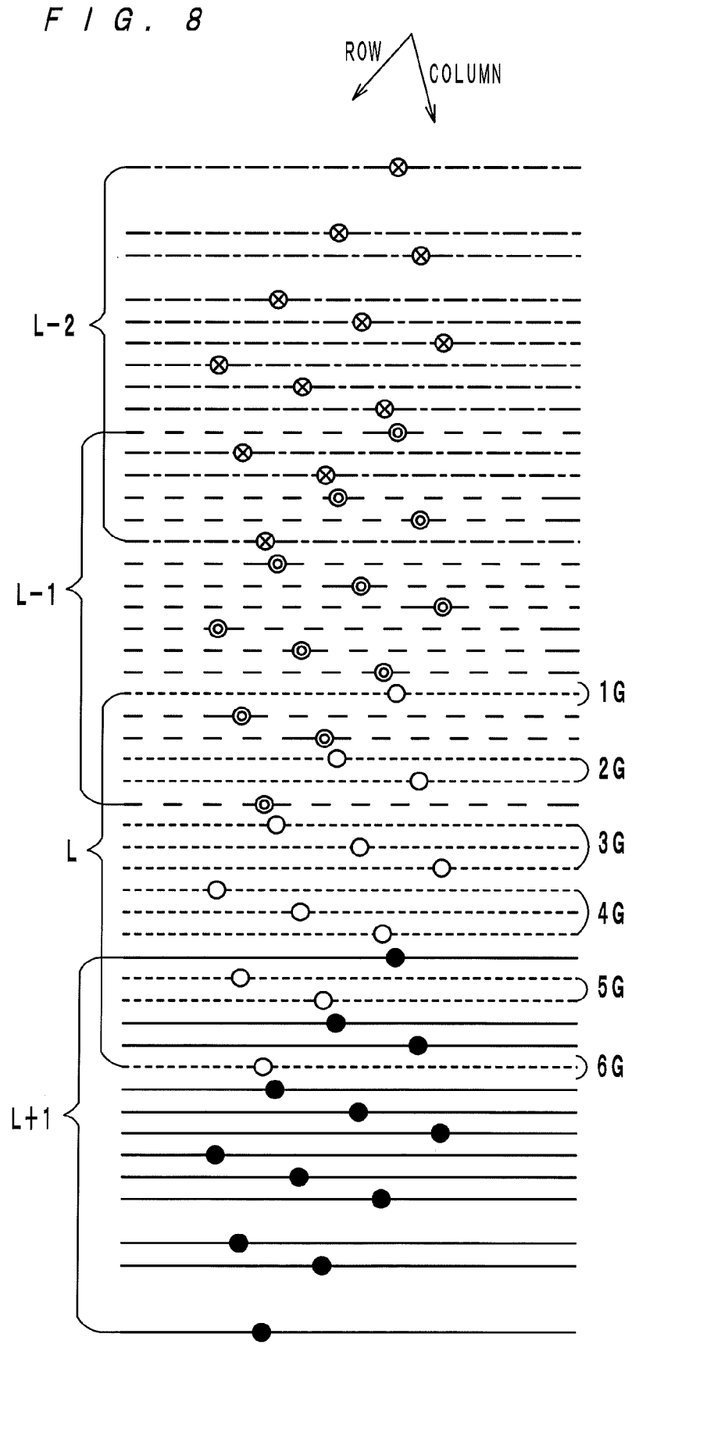
FIG. 8 shows scanning lines on which beams emitted from a fifth modified light source section are scanned while the optical scanning device makes the (L−2)th scanning motion to the (L+1)th scanning motion.

A fifth modified light source section 16e is described with reference to the drawings. FIG. 8 shows scanning lines on which beams B emitted from the fifth modified light source section 16e are scanned from the (L−2)th scanning motion to the (L+1)th scanning motion.

In the light source section 16e, as shown in FIG. 8, light emitting elements 36 are arranged in an area of a parallelogram, in a matrix of three rows and four columns, and four adjacent light emitting elements 36 make a diamond shape composed of two equilateral triangles. Every light emitting element 36 emits a beam B.

In a case of using the fifth modified light source section 16e, there is no gap between the groups 3G and 4G, and in an image formed by use of the fifth modified light source section 16e, the scanning lines S4 to S9 during one scanning motion are arranged adjacent to one another.

The optical scanning device 12 provided with the fifth modified light source section 16e also has the same advantages as the optical scanning device 12 provided with the light source section 16 shown by FIG. 2. The optical scanning device 12 provided with the fifth modified light source section 16e reduces density evenness due to reciprocity failure, and the light source section 16e is downsized.

In forming an image by use of the optical scanning device 12 provided with the fifth modified light source section 16e, three scanning lines S1 to S3 at the time of the Lth scanning motion are located in an area between a scanning line S1 and a scanning line S12 at the time of the (L−1)th scanning motion. On the other hand, in forming an image by use of the optical scanning device 12 provided with the fourth modified light source section 16d, only one scanning line S1 at the time of the Lth scanning motion is located in an area between a scanning line S1 and a scanning line S9 at the time of the (L−1)th scanning motion. Thus, the overlap area between the (L−1)th scanning motion and the Lth scanning motion in the case of using the optical scanning device 12 provided with the fifth modified light source section 16e is larger than that in the case of using the optical scanning device 12 provided with the fourth modified light source section 16d. Consequently, in the case of using the optical scanning device 12 provided with the fifth modified light source section 16e, it is less likely that density unevenness due to reciprocity failure is seen as stripes.

Sixth Modification

Figure 9:
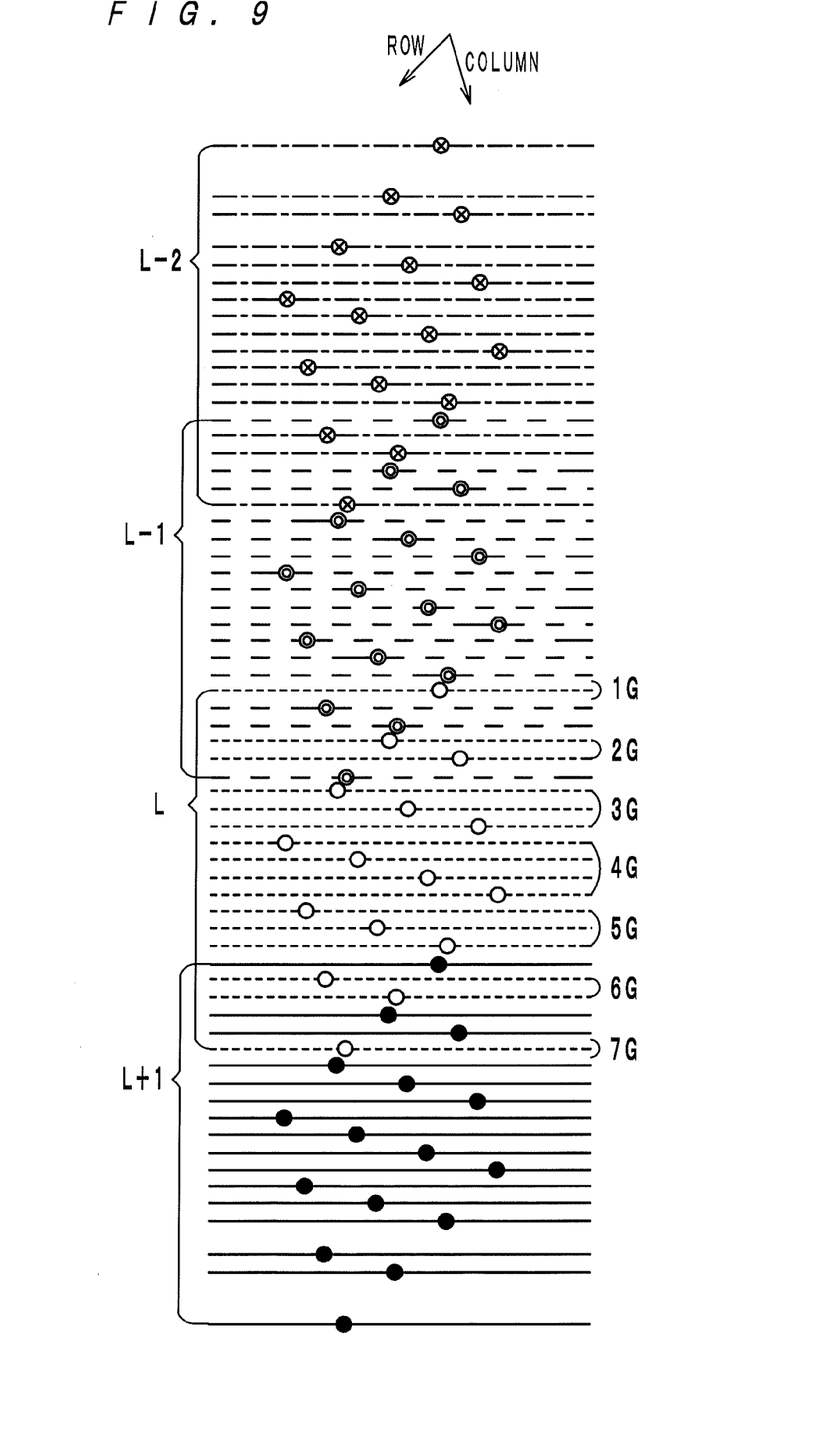
FIG. 9 shows scanning lines on which beams emitted from a sixth modified light source section are scanned while the optical scanning device makes the (L−2)th scanning motion to the (L+1)th scanning motion.

A sixth modified light source section 16f is described with reference to the drawings. FIG. 9 shows scanning lines on which beams B emitted from the sixth modified light source section 16f are scanned from the (L−2)th scanning motion to the (L+1)th scanning motion.

In the light source section 16f, as shown in FIG. 9, light emitting elements 36 are arranged in an area of a parallelogram, in a matrix of four rows and four columns, and four adjacent light emitting elements 36 make a diamond shape composed of two equilateral triangles. Every light emitting element 36 emits a beam B.

In forming an image by use of the optical scanning device 12 provided with the sixth modified light source section 16f, the groups 3G to 5G are adjacent to one another with no gaps thereamong. In other words, the scanning lines S4 to S13 are adjacent to one another.

The optical scanning device provided with the sixth modified light source section 16f also has the same advantages as the optical scanning device 12 provided with the light source section 16 shown by FIG. 2. The optical scanning device 12 provided with the sixth modified light source section 16f reduces density unevenness due to reciprocity failure, and the light source section 16f is downsized.

Thus, the optical scanning device 12 according to this embodiment can reduce density unevenness due to reciprocity failure and permits downsizing of a light source section.

Although the present invention has been described in connection with the preferred embodiment above, it is to be noted that various changes and modifications are possible to those who are skilled in the art. Such changes and modifications are to be understood as being within the scope of the invention.

What is claimed is:

1. An optical scanning device to be employed in an image forming apparatus comprising a photosensitive member that is scanned with a plurality of beams, said optical scanning device comprising:
   a plurality of light emitting elements that are arranged in an area of a parallelogram, in a matrix of M rows and N columns, all the light emitting elements emitting beams; and
   a deflector for deflecting the beams emitted from the light emitting elements;
   wherein the plurality of light emitting elements are arranged such that the beam emitted from the light emitting element located in the mth row and the nth column and the beam emitted from the light emitting element located in the (m−1)th row and the (n+1)th column are scanned on adjacent scanning lines on the photosensitive member; and
   wherein a scanning line on which the beam emitted from the light emitting element in the first row and the first column is scanned at a time of the (L+1)th scanning motion of the light emitting elements is located in an area from a scanning line on which the beam emitted from the light emitting element in the first row and the first column is scanned at a time of the Lth scanning motion of the light emitting elements to a scanning line on which the beam emitted from the light emitting element in the Mth row and the Nth column is scanned at a time of the Lth scanning motion of the light emitting elements,
   wherein M and N each represents an integer, M<N, a product of M×N represents the plurality of light emitting elements, m represents an integer from 2 to M, n represents an integer from 1 to N, and L represents an integer.

2. An optical scanning device according to claim 1, wherein the beams emitted from the light emitting elements are scanned on different scanning lines on the photosensitive member.

3. An optical scanning device according to claim 1, wherein scanning lines on which the beams emitted from the light emitting elements are scanned at the time of the Lth scanning motion of the light emitting elements do not overlap with scanning lines on which the beams emitted from the light emitting elements are scanned at the time of the (L+1)th scanning motion of the light emitting elements.

4. An optical scanning device according to claim 1, wherein M and N are integers equal to or greater than four.

5. An optical scanning device according to claim 1,
   wherein scanning lines on which the beams emitted from the light emitting elements are divided into a first group to a (M+N−1)th group traversing a sub-scanning direction;
   wherein a number of scanning lines in each of the first to the Nth groups is within one to N;
   wherein a number of scanning lines in each of the (N+1)th to the (M−1)th groups is N;
   wherein a number of scanning lines in each of the Mth to the (M+N−1)th groups is within 1 to N; and
   wherein scanning lines in the same group are arranged at intervals that are equal to intervals of scanning lines finally made on the photosensitive member to complete an image.

6. An optical scanning method to be carried out in an image forming apparatus comprising a photosensitive member that is scanned with a plurality of beams, said optical scanning method comprising the steps of:
   emitting a plurality of beams from a plurality of light emitting elements that are arranged in an area of a parallelogram, in a matrix of M rows and N columns; and
   deflecting the beams emitted from the light emitting elements;
   wherein the plurality of light emitting elements are arranged such that the beam emitted from the light emitting element located in the mth row and the nth column and the beam emitted from the light emitting element located in the (m−1)th row and the (n+1)th column are scanned on adjacent scanning lines on the photosensitive member; and
   wherein a scanning line on which the beam emitted from the light emitting element in the first row and the first column is scanned at a time of the (L+1)th scanning motion of the light emitting elements is located in an area from a scanning line on which the beam emitted from the light emitting element in the first row and the first column is scanned at a time of the Lth scanning motion of the light emitting elements to a scanning line on which the beam emitted from the light emitting element in the Mth row and the Nth column is scanned at a time of the Lth scanning motion of the light emitting elements,
   wherein M and N each represents an integer, M<N, a product of M×N represents the plurality of light emitting elements, m represents an integer from 2 to M, n represents an integer from 1 to N, and L represents an integer.

7. An optical scanning method according to claim 6, wherein the beams emitted from the light emitting elements are scanned on different scanning lines on the photosensitive member.

8. An optical scanning method according to claim 6, wherein scanning lines on which the beams emitted from the light emitting elements are scanned at the time of the Lth scanning motion of the light emitting elements do not overlap with scanning lines on which the beams emitted from the light emitting elements are scanned at the time of the (L+1)th scanning motion of the light emitting elements.

9. An optical scanning method according to claim 6, wherein M and N are integers equal to or greater than four.

10. An optical scanning method according to claim 6, wherein scanning lines on which the beams emitted from the light emitting elements are divided into a first group to a (M+N−1)th group traversing a sub-scanning direction;

wherein a number of scanning lines in each of the first to the Nth groups is within one to N;

wherein a number of scanning lines in each of the (N+1)th to the (M−1)th groups is N;

wherein a number of scanning lines in each of the Mth to the (M+N−1)th groups is within 1 to N; and wherein scanning lines in the same group are arranged at intervals that are equal to intervals of scanning lines finally made on the photosensitive member to complete an image.

* * * * *